(12) United States Patent
Ooshima et al.

(10) Patent No.: US 11,565,414 B2
(45) Date of Patent: Jan. 31, 2023

(54) MACHINING CONTROL SYSTEM AND MACHINING SYSTEM

(71) Applicant: FANUC CORPORATION, Yamanashi (JP)

(72) Inventors: Nao Ooshima, Yamanashi (JP); Shunichi Ozaki, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 248 days.

(21) Appl. No.: 16/836,383

(22) Filed: Mar. 31, 2020

(65) Prior Publication Data

US 2020/0316775 A1    Oct. 8, 2020

(30) Foreign Application Priority Data

Apr. 3, 2019   (JP) .............................. JP2019-071538

(51) Int. Cl.
*B25J 9/16*       (2006.01)
*G05B 19/19*    (2006.01)
(Continued)

(52) U.S. Cl.
CPC .............. *B25J 9/1664* (2013.01); *B23Q 3/18* (2013.01); *B25J 11/005* (2013.01); *G05B 19/19* (2013.01);
(Continued)

(58) Field of Classification Search
CPC ...... G05B 19/4155; G05B 2219/39195; G05B 2219/34016; G05B 2219/50391;
(Continued)

(56) References Cited

U.S. PATENT DOCUMENTS

2005/0256606 A1* 11/2005 Irri .................... G05B 19/41825
                                                                    700/213
2008/0154428 A1*  6/2008 Nagatsuka ............. B25J 9/1656
                                                                    700/258
(Continued)

FOREIGN PATENT DOCUMENTS

JP          S56-021794 A     2/1981
JP          H01-142808 A     6/1989
(Continued)

OTHER PUBLICATIONS

An Office Action; "Notice of Reasons for Refusal", mailed by the Japanese Patent Office dated Sep. 21, 2021, which corresponds to Japanese Patent Application No. 2019-071538 and is related to U.S. Appl. No. 16/836,383; with English language translation.

*Primary Examiner* — Stephen Holwerda
(74) *Attorney, Agent, or Firm* — Studebaker & Brackett PC

(57) ABSTRACT

A machining control system includes: a numerical control device controlling a machine tool; and a robot control device communicating with the numerical control device and controlling a robot having a plurality of drive axes. The numerical control device includes: a coordinate position command generation unit generating a coordinate position command specifying a target coordinate position at each time of a leading end part of the robot, based on a machining program; and a communication unit sending the current target coordinate position to the robot control device. The robot control device includes: a target drive position calculation unit calculating a target drive position of each of the plurality of drive axes to position the leading end part at the target coordinate position; and a drive command generation unit generating a drive command to each of the drive axes to position the drive axes at the calculated target drive position.

9 Claims, 2 Drawing Sheets

(51) Int. Cl.
    *B25J 11/00*    (2006.01)
    *B23Q 3/18*    (2006.01)
(52) U.S. Cl.
    CPC .............. *G05B 2219/31081* (2013.01); *G05B 2219/33034* (2013.01)
(58) Field of Classification Search
    CPC . B25J 13/02; B25J 13/06; B25J 9/1651; B25J 9/1628
    See application file for complete search history.

(56) References Cited

U.S. PATENT DOCUMENTS

| | | | | |
|---|---|---|---|---|
| 2010/0211220 | A1* | 8/2010 | Nishi | G05B 19/41825 700/248 |
| 2014/0286734 | A1* | 9/2014 | Oda | B23Q 7/04 414/222.01 |
| 2016/0059419 | A1* | 3/2016 | Suzuki | B25J 9/1692 901/14 |
| 2017/0017226 | A1* | 1/2017 | Yamazaki | B23Q 17/2471 |
| 2017/0028558 | A1* | 2/2017 | Nishi | B25J 9/1692 |
| 2019/0030715 | A1* | 1/2019 | Tarui | B25J 9/163 |
| 2020/0364173 | A1* | 11/2020 | Kuzmin | G06F 13/4282 |

FOREIGN PATENT DOCUMENTS

| | | | |
|---|---|---|---|
| JP | H06-043919 | A | 2/1994 |
| JP | 2010-076058 | A | 4/2010 |
| JP | 5752179 | B2 | 7/2015 |
| JP | 2018-161725 | A | 10/2018 |
| WO | 2020/144772 | A1 | 7/2020 |

\* cited by examiner

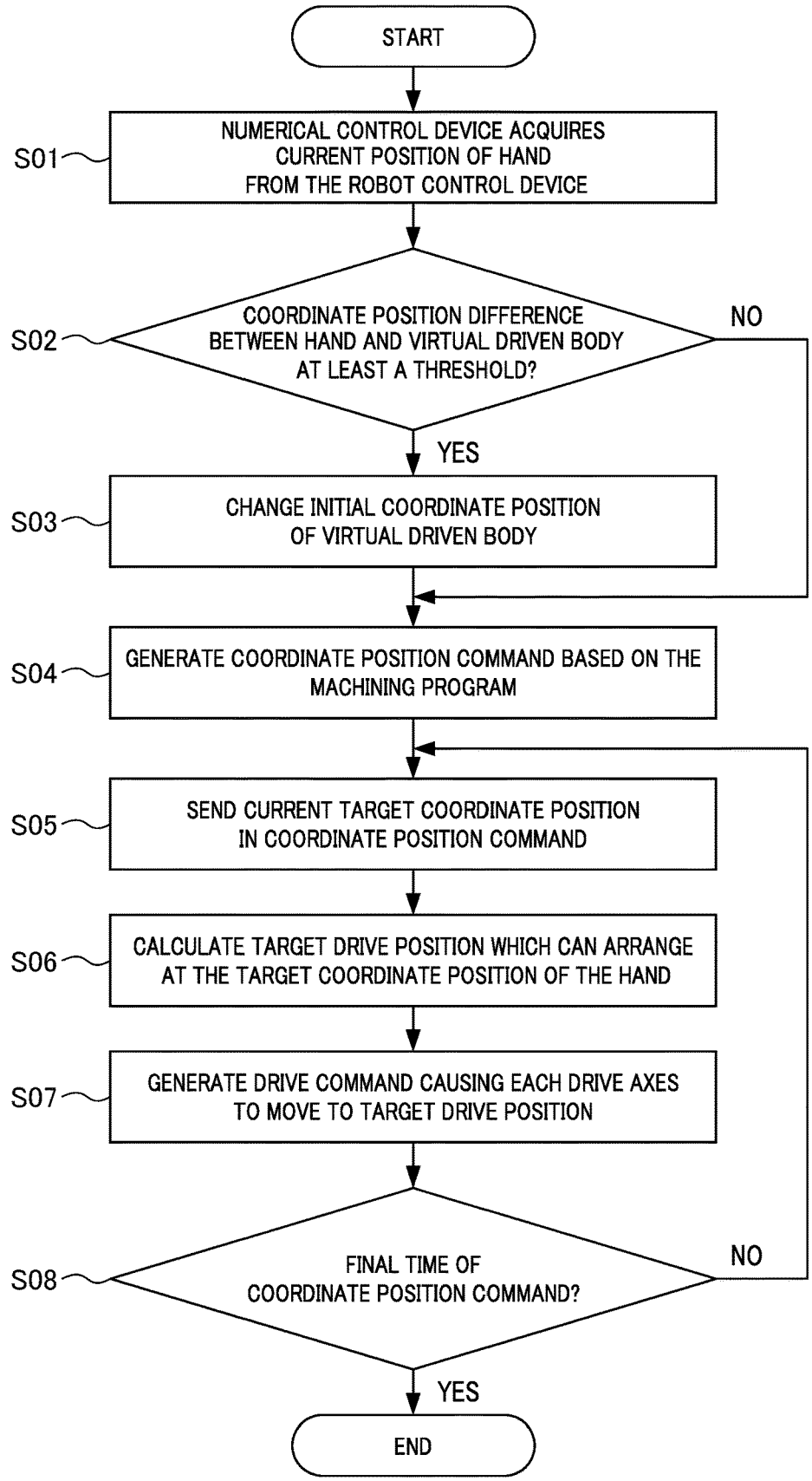

MACHINING CONTROL SYSTEM AND MACHINING SYSTEM

This application is based on and claims the benefit of priority from Japanese Patent Application No. 2019-071538, filed on 3 Apr. 2019, the content of which is incorporated herein by reference.

BACKGROUND OF THE INVENTION

Field of the Invention

The present invention relates to a machining control system and a machining system.

Related Art

There are machining systems which perform machining by the cooperation of a machine tool and a robot. As a specific example, a machining system has been known which automatically performs the attachment and removal of a workpiece to be machined by the machine tool (load/unload) using a robot. With such a machining system, a machining control system is necessitated which controls so as to make the machine tool and robot operate cooperatively.

For example, Patent Document 1 discloses a control device "comprising a machining program input means for inputting to the control device a machining program that includes at least one statement for machine tool and at least one statement for robot; a machining program storage means for storing in the control device a machining program which was inputted by the machining program input means; a machine tool control means for controlling the machine tool based on the statement for machine tool; a robot controls means for controlling a robot based on the statement for robot; and a machining program distribution means for transferring the statement for machine tool included in the machining program stored by the machining program storage means to the machine tool control means, and transferring the statement for robot to the robot control means".

Patent Document 1: Japanese Patent No. 5752179

SUMMARY OF THE INVENTION

The control device described in Patent Document 1 processes a machining program including a statement for machine tool and a statement for robot, transfers the statement for machine tool to the machine tool control means and transfers the statement for robot to the robot control means, by the machining program distribution means. However, the program system generally differs between the machine tool and the robot. For this reason, in order to create a machining program in which the statement for machine tool and statement for robot coexist, knowledge about programming of a machine tool and about programming (teaching) of a robot is required. For this reason, it has been desired to provide a machining control system and machining system that cause the machine tool and robot to cooperatively function easily.

A machining control system according to an aspect of the present disclosure includes: a numerical control device which controls a machine tool; a robot control device which communicates with the numerical control device and controls a robot having a plurality of drive axes, in which the numerical control device includes: a coordinate position command generation unit which generates a coordinate position command specifying a target coordinate position at each time of a leading end part of the robot, based on a machining program; and a communication unit which sends the target coordinate position that is current to the robot control device, and in which the robot control device includes: a target drive position calculation unit which calculates a target drive position of each of the plurality of drive axes so as to position the leading end part at the target coordinate position received from the communication unit; and a drive command generation unit which generates a drive command to each of the drive axes so as to position the drive axes at the target drive position calculated by the target drive position calculation unit.

According to the present disclosure, it is possible to provide a machining control system and machining system which cause a machine tool and robot to cooperatively function easily.

BRIEF DESCRIPTION OF THE DRAWINGS

FIG. 2 is a flowchart showing the sequence of control in the machining control system of FIG. 1.

DETAILED DESCRIPTION OF THE INVENTION

Figure 1:
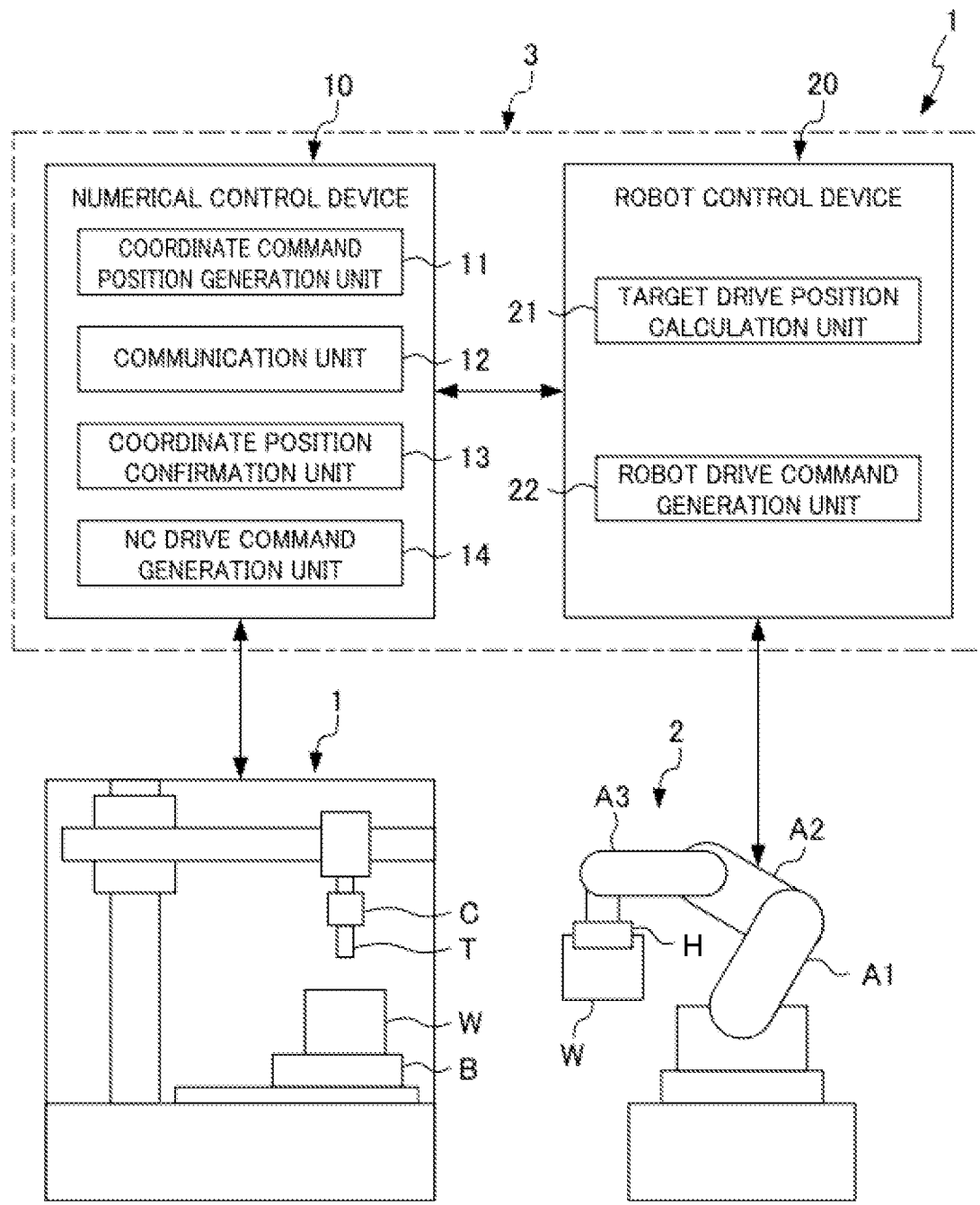
FIG. 1 is a view showing the configuration of a machining system according to an embodiment of the present disclosure.

Hereinafter, an embodiment of the present disclosure will be explained while referencing the drawings. FIG. 1 is a view showing the configuration of a machining system 100 according to an embodiment of the present disclosure.

The machining system 100 includes a machine tool 1, a robot 2, and a machining control system 3 which controls the machine tool 1 and robot 2. The machining control system 3 in itself is an embodiment of a machining control system according to the present disclosure.

The machine tool 1 has a plurality of drive axes, and causes a driven body to move by driving these drive axes. Although not particularly limited, as such a machine tool 1, it is possible to exemplify a machining center as a representative example. The machine tool 1 illustrated in FIG. 1 has a chuck C which retains a tool T, and a bed B which retains a workpiece W, and causes the chuck C and tool T, as well as the bed B and workpiece W, to move by way of the plurality of drive axes. In other words, the driven body in the machine tool 1 is the tool T (or chuck C retaining the tool T) and workpiece W (or bed B retaining the workpiece W). The machine tool 1 machines the workpiece W by causing the driven body to move by driving the drive axes.

The robot 2 has a plurality of drive axes and positions a leading end part. The robot 2 may be established as a vertical articulated robot such as that typically illustrated; however, it may be a cartesian coordinate robot, SCARA robot, parallel link robot or the like, for example. The robot 2 aids in machining of the workpiece W by cooperatively operating with the machine tool 1. The robot 2 illustrated in FIG. 1 has, sequentially installed from the base end side fixed to the floor, a first arm A1, second arm A2, third arm A3, and hand H which retains the workpiece W as a leading end part provided to the leading end. In the machining system 100, the robot 2 removes a machined workpiece W from the machine tool 1, and mounts to the machine tool 1 a new workpiece prior to machining.

The machining control system 3 includes a numerical control device 10 which controls the machine tool 1; and a robot control device 20 which communicates with the numerical control device 10 and controls the robot 2. In the machining system 100 of the present embodiment, the machining control system 3 is connected to the machine tool 1 and robot 2; however, the machining control system 3 may be connected to a simulator which reproduces movement of the machine tool 1 virtually, or a simulator which reproduces movement of the robot virtually, on a computer.

The numerical control device 10 has a coordinate position command generation unit 11 which generates a coordinate position command specifying a target coordinate position at each time of the leading end part (hand H) of the robot 2 in the machine tool 1 based on a machining program; a communication unit 12 which sends the current target coordinate position of the hand H to the robot control device 20; a coordinate position confirmation unit 13 which confirms a difference between the current coordinates of the hand H and the current target coordinate position; and an NC drive command generation unit 14 which generates a drive command relative to each of the drive axes of the machine tool 1 so as to cause the driven body to move to the target coordinate position calculated by the coordinate position command generation unit 11.

The numerical control device 10, for example, can be configured by installing the appropriate programs to a computer device equipped with a CPU, memory, I/O interface, etc. The coordinate position command generation unit 11, communication unit 12, coordinate position confirmation unit 13 and NC drive command generation unit 14 of the numerical control device 10 are distinguished functionally, and it is not necessary to be able to clearly distinguish in physical structure and program structure. In addition, the numerical control device 10 may be connected to the simulator of the machine tool 1, and in this case, may be configured integrally with the computer constituting the simulator.

The coordinate position command generation unit 11 calculates the target coordinate position at each time of the plurality of driven bodies of the machine tool 1, based on the machining program inputted by the operator, and generates the coordinate position command designating the time change of the target coordinate position of each driven body. The target coordinate position calculated by the coordinate position command generation unit 11 includes posture information in addition to coordinate information, and is preferably defined as position information of XYZWPR format or the like, for example.

The driven body defined by the coordinate position command generation unit 11 as the generation target of the coordinate position command specifying the target coordinate position includes, in addition to the tool T (or chuck C), workpiece W (or bed B), etc., for example, a virtual driven body (for example, virtual tool), which does not actually exist mechanically, and is a driven body that is virtual. The coordinate position of this virtual driven body corresponds to the desired coordinate position of the leading end part (hand H) of the robot 2. In other words, the coordinate position command generation unit 11 calculates the target coordinate position at each time of the leading end part of the robot 2 as the coordinate position of the virtual driven body. The coordinate position of the virtual driven body is preferably calculated as cartesian coordinates, so that the control of the robot control device 20 described later becomes easy.

The machining program preferably writes in G code the movement path in the coordinate space of each driven body (including the hand H). In other words, the coordinate position command generation unit 11 is preferably configured so as to calculate the target coordinate position at each time of each driven body, based on the contents of the G code in the machining program. The coordinate position command generation unit 11 can thereby be established as a similar configuration as well-known constituent elements creating the coordinate position command in conventional numerical control.

The mobile range of each driven body is preferably set in the coordinate position command generation unit 11. Therefore, the coordinate position command generation unit 11 preferably stores in advance the range in which the robot 2 can move the hand H as the mobile range of the virtual driven body, or acquires from the machining program. Even in a case of an inappropriate machining program being inputted, it is thereby possible to configure so as not to output a target coordinate position exceeding the mobile range of the robot 2.

The coordinate position command generation unit 11, in the case of the difference between the current coordinate position of the hand H and the target coordinate position of the target position command confirmed by the coordinate position confirmation unit 13 described later being at least a predetermined threshold, preferably changes the current target coordinate position (initial coordinate position of the virtual driven body) to the current coordinate position of the hand H, and then calculates the target coordinate position at each time thereafter based on the machining program. It is thereby possible to prevent the robot 2 from suddenly operating during control start, and generating excessive load.

Furthermore, the coordinate position command generation unit 11 may be configured so as to further calculate the target posture at each time of predetermined parts other than the hand H based on the machining program, for example, the third arm A3 to which the hand H is connected.

The communication unit 12 sends the current target coordinate position of the coordinate position command of the virtual driven body generated by the coordinate position command generation unit 11 to the robot control device 20 as the current target coordinate position of the hand H. Upon the transmission of this target coordinate position, in the case of the coordinate system of the machine tool 1 used in the numerical control device 10 and the coordinate system of the robot 2 used in the robot control device 20 differing, it may be configured so as to convert the current target coordinate position of the virtual driven body in the communication unit 12 into the coordinate system of the robot 2, and then transmit, or may be configured so as to do coordinate conversion in the robot control device 20. In addition, the communication unit 12 may transmit as target coordinate position text data.

In addition, the communication unit 12, in the case of the coordinate position command generation unit 11 calculating the target posture of the third arm A3, is configured so as to transmit the current target posture of the third arm A3, etc. together with the current target coordinate position of the hand H to the robot control device 20.

The coordinate position confirmation unit 13, prior to the communication unit 12 transmitting the target coordinate position, acquires the current coordinate position of the hand H in the current posture of the robot 2, and confirms whether the difference between the current coordinates of the hand H and the current target coordinate position in the coordinate position command is at least the threshold. The coordinate position confirmation unit 13 relays this confirmation result to the coordinate position command generation unit 11. The coordinate position command generation unit 11 can thereby prevent the robot 2 from suddenly operating and generating a great load unnecessarily, in the aforementioned way.

The NC drive command generation unit 14 generates a drive command relative to each of the drive axes of the machine tool 1 so as to cause the actual driven body to move to the target coordinate position calculated by the coordinate position command generation unit 11. The generation of the drive commands in this NC drive command generation unit 14 is the same as the generation of the drive command in a conventional numerical control device, and thus a detailed explanation will be omitted.

The robot control device 20 has a target drive position calculation unit 21 which calculates the target drive position of the drive position (position in the system of each drive axis such as the rotation angle position) of each of the plurality of drive axes corresponding to the target coordinate positions received from the communication unit 12 of the numerical control device 10; and a robot drive command generation unit 22 which generates a drive command relative to each drive axis of the robot 2, so as to position the drive axis at the target drive position calculated by the target drive position calculation unit 21. In addition, the robot control device 20 may include a servo amplifier that supplies electric power to the servomotor driving the drive axis of the robot 2.

The robot control device 20 can be configured by installing the appropriate program to a computer device equipped with a CPU, memory, I/O interface and the like, for example. The target drive position calculation unit 21 and robot drive command generation unit 22 of the robot control device 20 are distinguished functionally, and it is not necessary to be able to clearly distinguish in physical structure and program structure. The robot control device 20 may be configured integrally with the numerical control device 10; however, by providing separately, it is possible to design the machining control system 3 by simply changing the design of existing numerical control devices and robot control devices slightly. In addition, the robot control device 20 may be connected to a simulator of the robot 2. In this case, it may be configured integrally with the computer constituting the simulator.

The target drive position calculation unit 21 calculates the drive position of each drive axis of the robot 2 such that can arrange the hand H at the target coordinate position, i.e. combination of drive positions of the drive axes. The calculation of the drive position of the drive axes of the robot 2 which can arrange the hand H at the desired coordinate position in this way is well-known technology, and thus a detailed explanation will be omitted.

In addition, the target drive position calculation unit 21, in the case of the current target posture of a predetermined part such as the third arm A3 being sent from the communication unit 12, generates a position command specifying the target drive position of each of the plurality of drive axes of the robot 2 so that the target coordinate position calculation unit arranges the hand H at the target coordinate position, and the predetermined part such as the third arm A3 becomes the target posture. Upon the robot 2 arranging the hand H at a predetermined coordinate position of the machine tool 1 and performing mounting and removing, it is thereby possible to prevent a part (third arm A3, etc.) other than the hand H positioned at the target coordinate position of the robot 2 from interfering with the frame of the machine tool 1 or the like.

The robot drive command generation unit 22 generates a drive command such that the drive position of each drive axis of the robot 2 approaches the target drive position calculated by the target drive position calculation unit 21. The generation of such a drive command is the same as the generation of the drive command in the control of a conventional robot, and thus a detailed explanation will be omitted.

Next, the sequence of control of the machine tool 1 and robot 2 by the machining control system 3 will be explained while referencing FIG. 2. The control in FIG. 2 is control corresponding to one G code in the machining program.

The control by the machining control system 3 includes: a step of the numerical control device 10 acquiring a current coordinate position of the hand H of the robot 2 from the robot control device 20 (Step S01: current position acquiring step); a step of comparing the current coordinate position of the hand H and the initial coordinate position of the virtual driven body in the numerical control device 10 (Step S02: position comparing step); a step of changing the initial coordinate position of the virtual driven body in the numerical control device 10 to the current coordinate position of the hand H (Step S03: initial coordinate position changing step); a step of generating a coordinate position command specifying the target coordinate position at each time of the virtual driven body based on the machining program in the numerical control device 10 (Step S04: coordinate position command generating step); a step of sending the current target coordinate position of the virtual driven body from the numerical control device 10 to the robot control device 20 (Step S05: target coordinate position sending step); a step of calculating the target drive position of the drive axis which can arrange the hand H at the target coordinate position received from the numerical control device 10 in the robot control device 20 (Step S06: target drive position calculating step); a step of generating a drive command causing the drive axis to move to the target drive position in the robot control device 20 (Step S07: drive command generating step); and a step of confirming whether control has completed up to the last time of the coordinate position command (Step S08: end confirming step).

In the current position acquiring step of Step S01, the coordinate position confirmation unit 13 of the numerical control device 10 acquires the current coordinate position of the hand H of the robot 2 from the robot control device 20. In the case of acquisition of the current coordinate position of the hand H not being possible even if making at least a certain number of attempts for any reason, an alarm may be generated and control interrupted.

In the coordinate position comparing step of Step S02, the coordinate position confirmation unit 13 confirms whether the difference between the current coordinate position of the hand H of the robot 2 and the current coordinate position of the virtual driven body (initial coordinate position during control start following the order of one G code) of the numerical control device 10. In the case of the difference between the current coordinate position of the hand H and the initial coordinate position of the virtual driven body being at least the threshold, the processing advances to Step S03, and in the case of the difference between the current coordinate position of the hand H and the initial coordinate position of the virtual driven body being less than the threshold, the processing skips over Step S03, and advances to Step S04.

In addition, in the coordinate position comparing step of Step S02, in the case of the difference between the current coordinate position of the hand H and the initial coordinate position of the virtual driven body corresponding to the hand H being at least the threshold, for example, it may be configured so as to use the display, lamp or the like of the numerical control device to notify of this event.

In the initial coordinate position changing step of Step S03, the value of the initial coordinate value of the virtual driven body is changed to the value of the current coordinate position of the hand H acquired in the current position acquiring step. When this change has completed, the display of notifying in the coordinate position comparing step or the like may be released.

In the coordinate position command generating step of Step S04, the coordinate position command is generated such than moves the virtual driven body from the initial coordinate position until the arrival coordinate position designated in the G code of the machining program. The coordinate position command includes data specifying the target coordinate position at each time of the virtual driven body.

In the target coordinate position sending step of Step S05, the target coordinate position at the current time in the coordinate position command generated by the coordinate position command generating step is sent by the communication unit 12 to the robot control device 20.

In the target drive position calculating step of Step S06, the target drive position necessitated in order to arrange the hand H at the target coordinate position received from the numerical control device 10 for each of the plurality of drive axes of the robot 2 is calculated by the target drive position calculation unit 21.

In the drive command generating step of Step S07, the drive commands such that cause the plurality of drive axes of the robot 2 to move to the target drive position respectively calculated in the target drive position calculating step are generated, and the hand H is positioned at the target coordinate position of this time by driving the robot 2.

In the end confirming step of Step S08, it is confirmed whether having arrived at the final time of the coordinate position command. As a result of confirmation, if in the middle of coordinate position command, the processing returns to Step S05, and the target coordinate position of the next time is sent. On the other hand, in the case of control ending based on the target coordinate position of the final time of the coordinate position command, this control is ended, i.e. the processing corresponding to the currently executed instruction in the machining program is ended, and the processing corresponding to the next instruction is started.

In the above way, in the machining control system 3 according to the present embodiment, the numerical control device 10 has: the coordinate position command generation unit 11 which generates a coordinate position command specifying the target coordinate position at each time of the hand H (leading end part) of the robot 2 based on the machining program; the communication unit 12 which sends the current target coordinate position to the robot control device 20, in which the robot control device 20 has: the target drive position calculation unit 21 which calculates the target drive position of each of the plurality of drive axes positioning the leading end part at the target coordinate position received from the communication unit 12; and the robot drive command generation unit 22 which generates the drive command for each drive axes so as to position the drive axes at the target drive position calculated by the target drive position calculation unit 21.

In the machining control system 3 of the present embodiment, the numerical control device 10 generates a coordinate position command specifying the target coordinate position at each time of the hand H based on the machining program, and the robot control device 20 positions the hand H based on the coordinate position command generated by the numerical control device 10, without directly referencing the machining program. For this reason, in the machining control system 3, it is possible to also control the robot 2 by simply generating the machining program of the numerical control device 10. Therefore, even without mastering the teaching method of operation of the robot, so long as being an operator having mastered programming of a numerical control device for a normal machine tool, since it is possible to easily create a program of the machining control system 3, the machine tool 1 and robot 2 of the machining system 100 can be controlled.

With the machining control system 3 of the present embodiment, the coordinate position of the hand H is written in G code in the machining program, and the coordinate position command generation unit 11 calculates the target coordinate position of the hand H, by handling the coordinate position of the hand H in the machining program as the coordinate position of the virtual driven body of the machine tool 1. It is thereby possible to control operation of the robot 2 by G code. Therefore, the machining control system 3 of the present embodiment can make the machine tool 1 and robot 2 cooperatively function easily.

In addition, in the machining system 100, by combining the above control by G code and control of the hand H by well-known M code (control of retaining and releasing of workpieces W), it is possible to completely control the mounting and removing operation of the workpiece W to the machine tool 1 by the robot 2. In other words, in the machining system 100, by writing an instruction by G code for causing the hand H of the robot 2 to move, and an instruction by M code for causing the hand H to operate, in the machining program read into the numerical control device, it is possible to cause the robot 2 to appropriately operate, without carrying out operation to teach the operation of the robot 2 in the robot control device 20.

The numerical control device 10 of the machining control system 3 in the present embodiment simply adds control information of a virtual driven body to a conventional numerical control device, and thus design is easy. In addition, also for the functions of the robot control device 20 of the machining control system 3 in the present embodiment, since there is no great difference from the functions already implemented in some products, it can be designed easily.

Although an embodiment of a machining system according to the present disclosure has been explained above, the machining system according to the present disclosure is not to be limited to the aforementioned embodiment. In addition, the effects described in the present embodiment are merely listing the most preferred effects produced from the present disclosure, and the effects from the machining system according to the present disclosure are not limited to those described in the present embodiment.

As an example, in the machining control system according to the present disclosure, the target coordinate position may include only coordinate information, and not necessarily include posture information. In this case, the robot control device can be configured so as to generate position commands specifying the target coordinate position of each drive axis so as to hold constant the posture of the leading end part of the robot.

The coordinate confirmation unit in the machining control system according to the present disclosure, in the case of the difference in the current position being at least the threshold, may generate an alarm and interrupt operation.

EXPLANATION OF REFERENCE NUMERALS 1 machine tool
2 robot 3 machining control system
10 numerical control device
11 coordinate position command generation unit
12 communication unit
13 coordinate position confirmation unit
14 NC drive command generation unit
20 robot control device
21 target drive position calculation unit
22 robot drive command generation unit
100 machining system
H hand (leading end part)
W workpiece

What is claimed is:

1. A machining control system comprising:
a first processor which controls a machine tool; and
a second processor which communicates with the first processor and controls a robot having a plurality of drive axes,
wherein the first processor is configured to:
generate a coordinate position command specifying a target coordinate position at each time of a leading end part of the robot, based on a machining program; and
transmit the target coordinate position that is current to the second processor, and
wherein the second processor is configured to:
calculate a target drive position of each of the plurality of drive axes so as to position the leading end part at the target coordinate position transmitted from the first processor without directly referencing the machining program; and
generate a drive command to each of the drive axes so as to position the drive axes at the calculated target drive position.

2. The machining control system according to claim 1, wherein the first processor calculates the target coordinate position as a coordinate position of a virtual driven body of the machine tool written in G code in the machining program.

3. The machining control system according to claim 1, wherein the first processor is further configured to acquire a current coordinate position of the leading end part from the second processor, prior to transmitting the target coordinate position, and confirm a difference between the current coordinate position of the leading end part and the target coordinate position that is current in the coordinate position command.

4. The machining control system according to claim 3, wherein the first processor, in a case of a difference between the current position of the leading end part and the target coordinate position that is current being at least a predetermined threshold, changes the current target coordinate position to the current coordinate position of the leading end part, and then calculates the target coordinate position at each time thereafter, based on the machining program.

5. The machining control system according to claim 1, wherein the first processor further calculates a target posture at every time of a predetermined part other than the leading end part, based on the machining program, and
transmits the target posture that is current of the predetermined part, together with the target coordinate position that is current of the leading end part, and
wherein the first processor generates a coordinate position command specifying a target coordinate position of each of the plurality of drive axes so that the predetermined part becomes the target posture.

6. A machining system comprising:
the machining control system according to claim 1; a machine tool which is controlled by the first processor; and a robot which is controlled by the second processor.

7. A machining control system comprising:
a first processor which controls a machine tool; and
a second processor which communicates with the first processor and controls a robot having a plurality of drive axes,
wherein the first processor is configured to:
acquire a current coordinate position of the leading end part of the robot, and transmit a target coordinate position of the leading end part based on the current coordinate position and a machining program to the second processor; and
wherein the second processor is configured to:
generate a drive command to each of the drive axes so as to position the leading end part at the target coordinate position.

8. A machining control system comprising:
a first processor which controls a machine tool; and
a second processor which communicates with the first processor and controls a robot having a plurality of drive axes,
wherein the first processor is configured to:
specify a target coordinate position of a leading end part of the robot during an operation of the robot, based on a machining program; and
wherein the second processor is configured to:
generate a drive command to each of the drive axes so as to position the leading end part at the target coordinate position.

9. A machining control system comprising:
a first processor which controls a machine tool; and
a second processor which communicates with the first processor and controls a robot having a plurality of drive axes,
wherein the first processor is configured to:
be able to control the machine tool based on a machining program described with a first command and a second command,
specify a target coordinate position of a leading end part of the robot based on the first command,
specify a command that is different from a movement of the leading end part to the target coordinate position based on the second command, and
transmit the target coordinate position and the command to the second processor; and
wherein the second processor is configured to:
generate a drive command to each of the drive axes so as to position the leading end part at the target coordinate position, and
control at least one of the robot and the leading end part based on the command.

* * * * *